United States Patent
Owegeser (10) Patent No.: US 9,491,897 B2
(45) Date of Patent: Nov. 15, 2016

(54) DEVICE FOR REMOVING FILLING MATERIAL AND FOR WINDING OF USED ARTIFICIAL TURF FIELDS

(71) Applicant: SMG Sportplatzmaschinenbau GmbH, Voehringen (DE)

(72) Inventor: Johann Owegeser, Illerrieden (DE)

(73) Assignee: SMG Sportplatzmaschinenbau, Voehringen (DE)

( * ) Notice: Subject to any disclaimer, the term of this patent is extended or adjusted under 35 U.S.C. 154(b) by 37 days.

(21) Appl. No.: 14/251,517

(22) Filed: Apr. 11, 2014

(65) Prior Publication Data

US 2014/0305669 A1    Oct. 16, 2014

(30) Foreign Application Priority Data

Apr. 15, 2013  (DE) .................. 20 2013 101 597
Aug. 22, 2013  (DE) .................. 20 2013 103 799
Oct. 18, 2013  (DE) .................. 20 2013 009 251

(51) Int. Cl.
*A01B 45/04*    (2006.01)
*E01C 23/12*    (2006.01)

(52) U.S. Cl.
CPC ............ *A01B 45/04* (2013.01); *E01C 23/121* (2013.01)

(58) Field of Classification Search
USPC ..................................... 172/19, 20
IPC .................................... A01B 45/04
See application file for complete search history.

(56) References Cited

U.S. PATENT DOCUMENTS

| | | | | |
|---|---|---|---|---|
| 3,675,793 A * | 7/1972 | Wetzel | ............... | B65G 57/035 172/20 |
| 4,903,778 A * | 2/1990 | Brouwer | ............... | A01B 45/04 172/1 |
| 4,944,352 A * | 7/1990 | Brouwer | ............... | A01B 45/04 172/19 |
| 5,655,729 A * | 8/1997 | Casimaty | ............... | A01B 45/04 242/535.1 |
| 6,056,064 A * | 5/2000 | deVries | ............... | A01B 45/04 172/19 |
| 6,223,830 B1 * | 5/2001 | deVries | ............... | A01B 45/04 172/1 |
| 6,273,196 B1 * | 8/2001 | Van Vuuren | ......... | A01B 45/045 172/20 |
| 6,659,189 B2 * | 12/2003 | Woerner | ............. | A01B 45/045 172/20 |

(Continued)

FOREIGN PATENT DOCUMENTS

EP          2387875 A1     11/2011
WO     2010094576 A1      8/2010

(Continued)

*Primary Examiner* — Gary Hartmann
(74) *Attorney, Agent, or Firm* — Loginov & Associates, PLLC; William A. Loginov (57) ABSTRACT

A device for removing filling material from a stripe-shaped band material, in particular from an artificial turf, having a transport system for conveying the band material comprising at least one transport means, and having a diverting means for widening and folding of the band material, so that the filling material can fall off the band material, as well as an emptying means for the band material arranged in a region of the band material being folded, wherein the device has at least one of a pressure roller arranged when viewed three-dimensionally underneath the transport system.

20 Claims, 9 Drawing Sheets

(56) References Cited

U.S. PATENT DOCUMENTS

| | | | | |
|---|---|---|---|---|
| 6,827,151 B1* | 12/2004 | Winslow | ............ | A01B 45/00 172/32 |
| 8,235,131 B2* | 8/2012 | Brouwer | ............ | A01B 45/045 172/20 |
| 8,336,638 B2* | 12/2012 | Brouwer | ............ | A01B 45/045 172/20 |
| 8,479,835 B2* | 7/2013 | Brouwer | ............ | A01B 45/045 172/1 |
| 8,505,643 B2* | 8/2013 | Brouwer | ............ | A01B 45/045 172/20 |
| 2010/0319510 A1 | 12/2010 | Bearden | | |
| 2012/0006930 A1 | 1/2012 | Mitchell | | |

FOREIGN PATENT DOCUMENTS

| | | |
|---|---|---|
| WO | 2012142610 A1 | 10/2012 |
| WO | 2013042816 A1 | 3/2013 |

* cited by examiner

DEVICE FOR REMOVING FILLING MATERIAL AND FOR WINDING OF USED ARTIFICIAL TURF FIELDS

BACKGROUND OF THE INVENTION

The invention refers to a device for removing filling material from a stripe-shaped band material, in particular from an artificial turf. Corresponding devices have become known from prior art, and are used in particular for preventive maintenance of artificial turf fields, their laying or their removal. Thereby turfs are also picked up and wound up for recycling or reuse. To allow for doing so, sand is removed from the field and s stored for further use in so-called big bags. This also applies for synthetic filling that is stored in big bags for recycling as well.

SHORT SUMMARY OF THE INVENTION

It is a problem underlying the present invention to provide for a device for removing filling material from a stripe-shaped band material, in particular from an artificial turf, that guarantees a highly reliable separation of filling material and band material, and that is additionally constructed with low complexity, can be used flexibly, and manufactured cost-efficiently.

The problem is solved by a device for removing filling material from a stripe-shaped band material that provides for a transport system for conveying the band material and comprising at least one transport means for widening and folding the band material so that the filling material can fall off from the band material. Furthermore, the device comprises emptying means for the band material arranged in a region of the folded band material. Furthermore, at least one pressure roller is provided that is arranged, when viewed three-dimensionally, underneath the transport system.

A preferred embodiment of the device provides for diverting means configured as a part of the transport system, in particular as transport means. The diverting means can be configured, for example, as one of a roller, a cylinder or a shaft and/or an axle serving for guiding a transport belt or the like and for changing its direction. Diverting can be up to 180° here so that the transport element that has changed its direction by the diverting means is guided in a direction opposite to the one of the first transport direction.

Another embodiment of the invention provides for a gap between the at least one pressure roller and the transport system and/or the diverting means the gap being provided for guiding the band material, in particular for its friction-fit conveying. A friction-fit conveying has to be understood as conveying wherein transport means and/or pressure roller are in contact with both sides of the band material, and these transport means or pressure rollers are able to reach a linear movement of the band material based on friction between the band material and the transport means and/or pressure rollers. The band material is in contact with or supported on the transport system and/or an element of the transport system, for example the transport means and the pressure roller. Besides guiding the band material, also its movement in the device is ensured so that a permanent conveying of the band material by the device and an almost complete discharging of the band material and/or excess filling or litter material present therein, such as, for example, sand and/or all other materials provided and suitable for filling artificial turf fields is effected.

A further embodiment of the device provides for the transport system covering and/or spanning the emptying means or the at least one pressure roller in conveying direction. This configuration allows for a particularly compact construction. This brings advantages, in particular when work is performed on smaller fields and/or if there is only little space available for storing the device. A device that over all is more compact can also be transported easier, if intended to configure the device as towed device.

An emptying means is an arrangement of one or more device parts impacting the band material, such as, for example, rollers, tapping rollers, pressure rollers or other elements suitable for engaging with or gripping the band material. It is decisive that the emptying means is able to treat the band material such that filling or litter material is removed from the band material. Also brushes or toothed wheels, and/or spiked or toothed rollers that can impinge or engage with the band material in order to make the filling material fall off, being beaten off, combed or brushed off the band material or be removed in any other way from the band material can also be seen as emptying means. However, even mallets or brushes, such as, for example, rotating brushes or rotating mallets can be provided as emptying means.

An essential feature of the invention device is that the specific arrangement of each single functional element guarantees a highly reliable guidance for the band material through the device, in particular through its diverting and emptying means. The region of the folded band material has to be understood in such a way that said region starts, seen in conveying direction of the band material, at that point where the band material is orientated for the first time from its plane conveying position at the transport means towards a differing, folded position. Just during folding the band material and its, for example discharging by beating, a reliable guidance is decisive in order to avoid the band material from seizing in the device and to thus block constant conveying. The pressure roller interacts with the transport means to adjust conveying speed, and the band material cannot pile up therebetween. As the pressure roller is additionally arranged below the transport means a particularly simple discharging of filling material in the free space situated below is possible. This allows in particular for a considerably less complex construction of the device with respect to, for example, the lateral discharging of filling material.

In connection with the current invention, transport means is a means and/or an arrangement of elements ensuring a continuous transport of the band material. For example, an arrangement of several rollers or cylinders the band material is guided across is an option. A transport line, a transport belt or a belt consisting of several links and extending longitudinally, a conveying chain or a drag chain or a link belt are to be understood as transport means as well. The transport means generally comprises at least one drive ensuring linear feed motion of the elements of the transport means. By suitable diverting means an endless belt or the like can be used or provided whereon the band material is guided and/or through which the band material is drawn, pulled or transported.

Advantageous embodiments of the invention device according to are subject of the dependent claims.

The features of the embodiments subject of single dependent claims as well as parts thereof can of course be combined individually or groupwise with the device as defined in the independent claim. This advantageously develops the device further. It is also possible to combine single features from different dependent claims and/or with the features of the independent claim. The invention comprises these variants as well.

A first preferred embodiment of the invention device provided for the at least one pressure roller being able to interact with the at least one transport means of the transport system and/or the diverting means such that the band material can be conveyed at least friction-fit between transport means and pressure roller, and/or diverting means and pressure roller. This ensures directional stability and reliable conveying of the band material wherein additionally band material filled highly and/or unevenly with filling material can be transported without sliding.

Another preferred embodiment of the invention device provides for the emptying means comprising at least one pressure roller for tensioning the band material. The pressure roller not necessarily has to exhibit a closed lateral surface, first of all it is important to prevent a possible piling-up of the band material by tensioning, and, at the same time, to widen the pile of, in particular, an artificial turf in order to facilitate removal of filling material.

The device according to the invention is restricted to use with artificial turfs and/or artificial turf fields. There is, of course, also the option of picking up all kinds of sport field coverings or other floor coverings. For example, the invention is also suitable for removal of dirt, dust or other contaminations contained in worn sport field coverings and/or other floor coverings.

Another advantageous embodiment of the device according to the invention provides for the emptying means comprising at least one tapping roller for beating the band material. A band material, such as an artificial turf folded accordingly, is partly emptied already by turning it over to allow the filling material to fall off downwards. However, the efficiency of emptying can be significantly increased by additional mechanical treatment of the band material as performed by a tapping roller. Depending on the requirements said tapping roller can exhibit, seen in cross section, a polygonal profile to periodically widen the surface of the band material pointing downwards and to expose the same to vibrations. This results in a very good discharging effect. The pressure roller may also be a part of the transport means or diverting means, however, it is preferred that it is configured and arranged as a part of the emptying means. The highest vibrations appear just in the emptying means which may affect a reliable guidance of the band material. The pressure roller can be arranged in the conveying direction of the band material on, above or below the level of the diverting means or downstream thereof allowing for different structural variations in the device. It is also preferred that several pressure rollers are provided the rotational speed of which can be controlled with respect to each other and/or jointly. Thus a particularly good coordination between the conveying elements can be achieved to ensure a reliable guidance of the band material through the device, and in particular to prevent the same from piling up.

The tapping rollers can be substituted for or supplemented by axles or shafts with movable mallets periodically impacting the band material while turning to thus tapping off the filling material. Rollers, that is cylindrical, rotating elements carrying bulges and/or projections spread in irregular distance on their surface and tapping the band material when rotated are encompassed as well.

Another advantageous embodiment of the invention device provides for the emptying means comprising two pressure rollers each interacting with the lower run of the transport means for conveying the band material having a tapping roller arranged between the pressure rollers. The band material is guided S-shaped or wavelike across the pressure rollers and tapping roller (on the underside of the transport means). This allows for a discharging effect that is further improved by tensioning the band material at the working point of the tapping roller. Preferably, the tapping roller is arranged such that the band material can be guided wave- or meander-like across the pressure rollers and through the device. In addition to the above-described tensioning, the band material is also widened to separate filling material even better. Further, the band material is pushed against a lateral surface of the tapping roller enabling same to treat the band material more efficiently.

In a modification according to the invention, at least one pressure roller is positioned at some distance, e.g. few millimeters to several centimeters from the lower run of the transport means, that is the pressure roller is spaced from the lower run, so that a reliable guidance of the band material across the tapping roller is performed, but no tensioning is carried out in this region anymore.

Another advantageous embodiment of the device according to the invention also provides for the at least one pressure roller having a lateral surface with projections such as, teeth, jags, or prongs for engaging with a band material. This significantly improves the guidance of the band material and additionally loosens the same to facilitate removal of the filling material. Preferably the at least one pressure roller comprises a rotating shaft with at least one star wheel attached thereto. Even though such pressure roller does not have a continuous, closed lateral surface, it is not less efficient but in addition constructed less complex and weight-saving. Preferably the at least one star wheel is attached to the rotating shaft with slope orientation with respect to the rotating shaft. Thus the pressure roller not only performs function in guiding and tensioning, but also effects milling of the band material by tumbling movement during rotation of the shaft thereby achieving a significantly enhanced removal of filling material from the band material.

A further preferred embodiment of the device according to the invention provided for the diverting means comprising at least one tapping roller the band material can be guided across. The effect of such a tapping roller is significantly enhanced as it impacts in the diverting region and thus in the widened condition of the band material wherein the filling material can be separated from the band material more easily. For a less complex construction of the device according to the invention preferably the diverting means is formed at least in part by a diverting roller of the transport means. Preferably the tapping rollers have different beat frequency, either individually or groupwise. This allows for a specific adaptation with respect to the actual position of the band material and of the working intensity that has to be performed at this particular position. Thus, the filling material can be loosened in the diverting region, before it is beaten off in a subsequent working step, whereupon remainders are subjected to a intensive treatment.

In another preferred embodiment of the device according to the invention the at least one transport means of the transport system is configured to have one or more circulating transport belts. It is possible to arrange several transport belts consecutively, with respect to the direction of conveying. As an alternative or combination, it is also possible to configure the at least one transport means of the transport system as at least one transport arrangement having a multitude of spaced, parallel arranged transport belts. This also ensures highly reliable conveying of the band material. Preferably an upper and lower run of the transport means serves for transporting the band material.

In further preferred embodiment of the device according to the invention a conveying means for removing the separated filling material is provided for reliably ejecting from the device, to remove and/or to store the same. This allows for continuous operation of the device not necessarily requiring a storage. Preferably the conveying means comprises a conveyor belt pivotable by 180° to enable flexible uptake of the filling material separated from the band material, for example upstream or downstream of the device.

In another preferred embodiment of the device according to the invention, additionally a processing means for winding, chopping or re-laying the filling material-free band material is provided. Thus depending on the specific requirements, the device can be used flexibly, in particular when the processing means can be exchanged at the device depending on the required process.

In another preferred embodiment of the device according to the invention a cutting means, for example a knife, a saw, a cutting disc, scissors or the like for cutting the band material filled with filling material to size are provided, to avoid any pre-treatment of the band material spread on the floor prior to using the device. Thus the device allows for a high degree of automation to easily handled the device. A further, entirely autonomous use without any additional (towing) apparatus is possible if the device is configured as self-propelled vehicle. It may be preferred to configure the device as a towed device if required by certain circumstances, in particular in order to save expenses or weight. An especially high degree of automation in combination with a high processing quality of the band material is achieved if the device is equipped with a sensor-based automatic control. This is in particular the case if larger surfaces areas of laid band material have to be processed, and/or if these are surrounded by unambiguously detectable boundaries.

Another preferred embodiment of the device according to the invention additionally provides for the device having a portal bridge spanning the input area of the device, whereas the input area is located, with respect to the direction of conveying of the band material, in front of the diverting means, and the portal bridge carries a drive motor of the device. The drive motor arranged centrically and upside does neither affect, on the one hand, the processing procedure of the band material performed underneath, nor will, on the other hand, this confer a position of center of gravity to the device enabling either of easy maneuverability, and stability to ensure reliable operation even with large throughput of band material.

Another preferred embodiment of the device according to the invention provides for the diverting means being configured as part of the transport system, in particular as transport means. The diverting means has a double function allowing for a less complex construction of the device. In this case the diverting means continuous to serve for diverting the band material, but also transporting the same. In consequence a particularly compact configuration of the device is generated having high functional integration by simultaneously conveying and diverting the band material using a single component. The diverting means may preferably comprise at least one diverting roller that is in particular equipped with at least one tapping roller. This results in a further functional focusing upon the diverting roller allowing for a less complex, lighter and more cost-efficient construction of the device. In particular, a diverting roller equipped with at least one tapping roller allows, beside deflecting and conveying the band material, also for a significantly improved discharging already in the region of widening the band material.

A further preferred embodiment of the device according to the invention provides for the emptying means comprising at least one pressure roller in particular equipped with one tapping roller. The pressure roller also exhibits an improved discharging effect by pressing and tapping the band material, allowing for also a less complex, lighter, and more cost-efficient construction by functional focusing upon said pressure roller. Such pressure roller thus does not only serve for, if required, transporting, widening and aligning the band material in region of discharging, but, in this particular embodiment, also for more effective discharging thereof. In order to allow for easy threading of the band material, in an area between the diverting means and a first pressure roller, a further, e.g. second pressure roller can be arranged for threading the band material between the diverting means and the first pressure roller. An easy threading of the band material may be further supported by providing a guiding plate for feeding the band material in a gap between the diverting roller and the further pressure roller.

A preferred embodiment of the device according to the invention provides for the at least one diverting roller and/or pressure roller comprising a rotationally driven support frame for several tapping rollers rotationally driven as well and supported on the frame. This significantly enhances discharging the band material, by, on the one hand, the rotating support frame, and, on the other hand, the tapping rollers supported thereon. This improved emptying effect does not require any further components or modules but can be realized with the already present functional elements, such as the at least one diverting roller and/or pressure roller. In this respect, this embodiment of the device according to the invention provides a functional focusing upon the diverting roller and/or pressure roller with a simultaneous increase of efficiency. Even though the tapping rollers can be arranged arbitrarily at the support frame it turned out to be a particularly easy and effective construction if those are orientated parallel with respect to the rotational axis of the support frame. Preferably, seen in the direction of rotation, the tapping rollers have a cross section, that is non-circular, in particular cross-like, rectangular, or square. However, also other rotational axis of the tapping rollers having few corners or being configured polygonal, in particular having a triangular cross section are encompassed. Basically, tapping could also be effected by appropriate arrangement of knobs or the like on the tapping roller, however, the non-circular, in particular cross-like cross section of a tapping roller has turned out to be either of easily machinable and very effective.

Another advantageous embodiment of the device according to the invention provides for the emptying means having two pressure rollers interacting with the diverting means for conveying the band material, each arranged and dimensioned to convey the band material meander-like between the diverting means and the two pressure rollers. This in particular results in the advantage of reliable, conveyance free of sliding, having directional stability, even if the band materials are unevenly loaded, wherein a pile is widened and closed to allow the filling material to fall off very easily. If the diverting means and/or the pressure rollers are at the same time configured as tapping rollers, or comprise those in any other way, a very efficient emptying of the band material is ensured.

The above-mentioned problem of the present invention is also solved by a device for removing filling material from a stripe-shaped band material providing a transport system for conveying the band material and comprising at least one transport means provided with a diverting means for widening and folding the band material so that the filling material can fall off the band material. Furthermore, the invention comprises an emptying means for the band material arranged in a region of the band material being folded. Furthermore, at least one pressure roller is provided that is arranged when viewed three-dimensionally underneath the transport means of the transport system having said diverting means.

An essential issue of the device according to the invention is a rather high functional focusing upon the diverting means used for diverting, transporting and/or conveying the band material and as well for emptying the same. This simultaneously allows for less complex construction of the invention device and reduction of weight, thus lowers expenses and minimizes costs incurring for maintenance and/or repair.

The above-mentioned problem of the present invention is also solved by a device for removing filling material from a stripe-shaped band material having a transport system for conveying the band material comprising at least one transport means and one diverting means for widening and folding the band material so that the filling material can fall off the band material. Furthermore, an emptying means is provided for the band material arranged in a region of the folded band material, and at least one pressure roller arranged, seen three-dimensionally, underneath the transport means of the transport system. The emptying means comprises two pressure rollers each interacting with the diverting means for conveying the band material, and arranged and dimensioned such that the band material can be conveyed meander-like between the diverting means and the two pressure rollers.

An essential issue of this invention device is a very high functional focusing upon the diverting means that is used for diverting, transporting and/or conveying the band material, and as well for discharging the same. This allows for construction of the invention device with very low complexity, reduced weight and lowered costs as well as minimized expenses for maintenance and/or repair. Simultaneously this allows for a reliable, conveyance free of sliding, with high directional stability, even of band material that is unevenly loaded, wherein a pile with alternate widening and closing for the filling material to fall off easily. If the diverting means and/or the pressure rollers are additionally configured as tapping rollers, or comprise the same in any other way, very efficient discharging of the band material is ensured.

The device according to the invention allows for a fully automated picking of the stripe-shaped band material such as artificial turf, from a site. The cutting means ensures an exact detachment of the turf band to be removed that is carried throughout entire operation of the device without additional auxiliary means or manual intervention. This enables a complete removal of the filling material, for example by alternating or alternated frequencies of the tapping rollers and its removal from the device, for example by means of a conveyor belt. The conveyor belt can be pivotable by 180° to load a transport equipment, such as a motor dumper, a wheel loader, a truck or a big bag filling device.

The advantages of the construction of the device are low weight and compact design ion combination with an onboard drive, such as a diesel engine and/or a hydraulic control. When used on an artificial turf field the entire turf surface can be picked up and removed by means of the device. Low weight and balanced load as well as large-dimensioned tires allow for a gentle passing over the remaining fundament. For the accurate and straight removal of the turf stripes sensor-based automatic straightforward control of the device may be provided.

BRIEF DESCRIPTION OF THE DIFFERENT VIEWS OF THE DRAWINGS

The figures schematically depict a preferred embodiment of the invention. In the figures.

In the figures identical or corresponding elements each are denoted with the same reference numerals, and therefore, if not required, not described anew.

DETAILED DESCRIPTION OF THE PREFERRED EMBODIMENT

Figure 1:
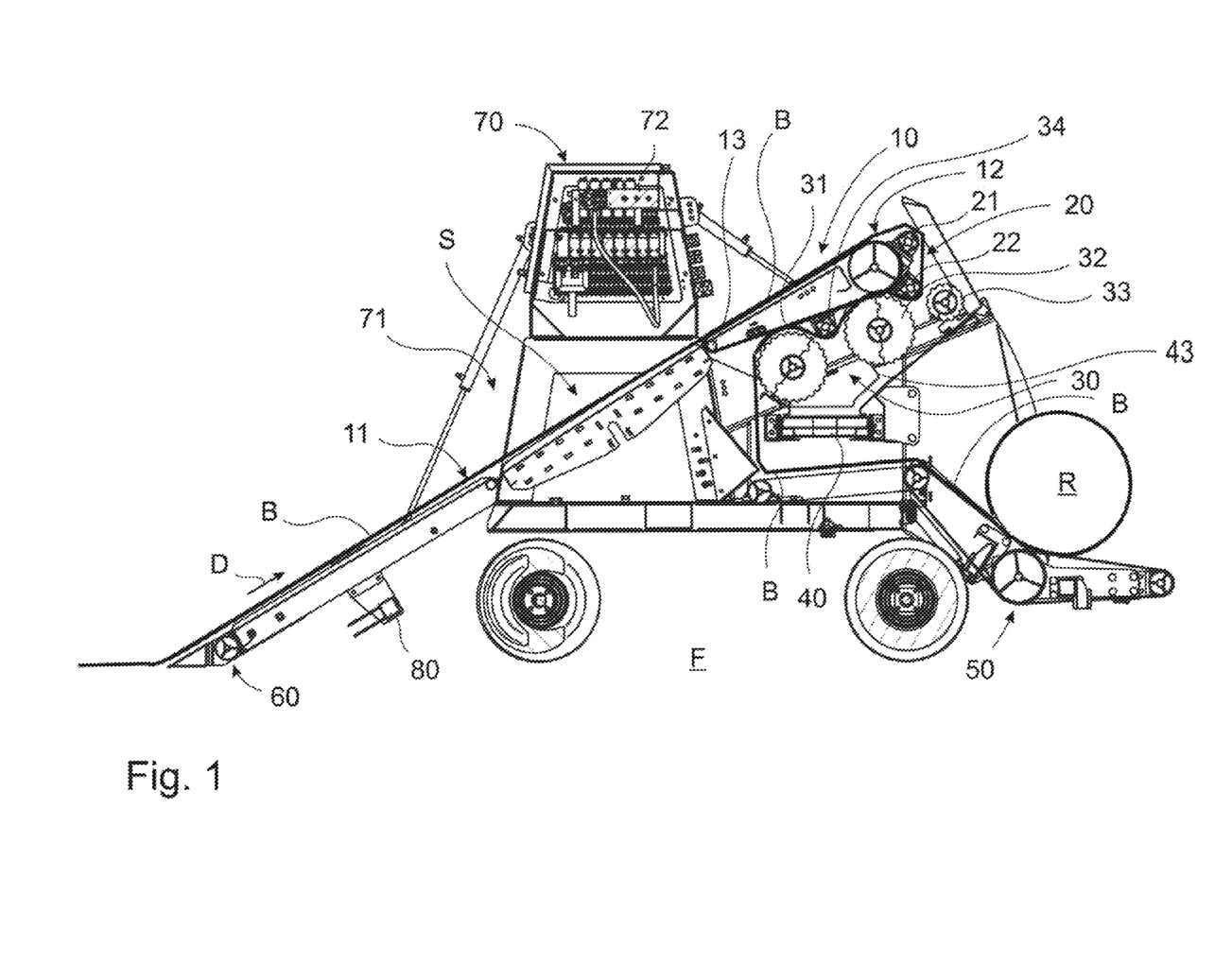
FIG. 1 shows a longitudinal section of a side view of an invention device for separating filling material from a stripe-shaped band material.

FIG. 1 shows a longitudinal section of a side view of a device according to the invention for separating filling material from a stripe-shaped band material B, that is supposed to be, in this example, a laminar laid artificial turf. Stripes of this artificial turf B are guided by a transport means 10 towards a diverting means 20, and further guided wave-like through an emptying means 30, wherein a filling material put on the artificial turf B falls off onto a conveying means 40 that conveys it the material towards the side of the device facing the viewer. The artificial turf B is conveyed by the transport means 10 across a ramp 11, and is wound after passing the emptying means 30 in a processing means 50. The processing means 50 can be lowered for effortless unloading the artificial turf coil R. Single stripes of the artificial turf B are separated from the two-laminar surface by cutting means 60 arranged at the front end of the ramp 11. The device according to the invention is configured as an self-propelled device with a chassis F that can be controlled automatically via a sensor 80.

Figure 2:
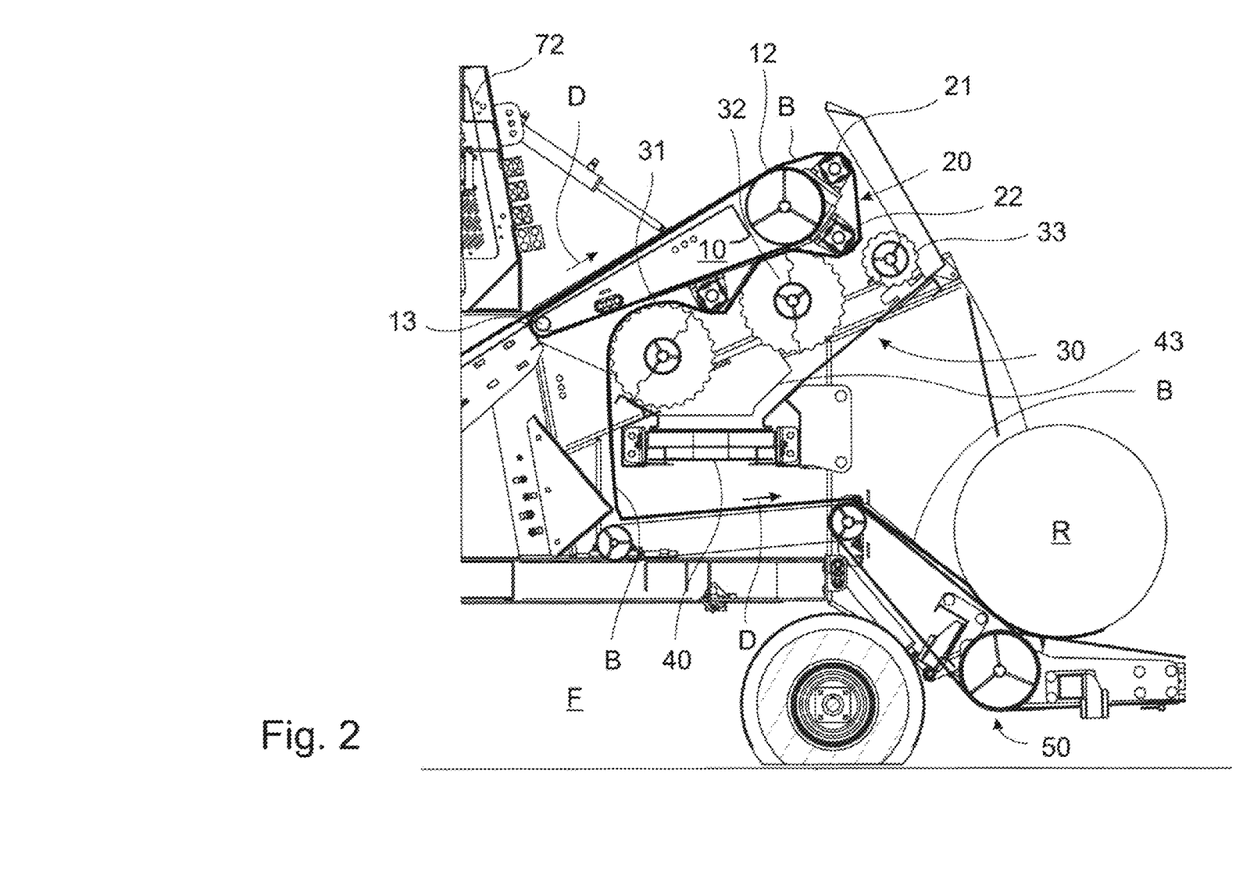
FIG. 2 shows an enlarged detailed view of the device according to FIG. 1.
Figure 7:
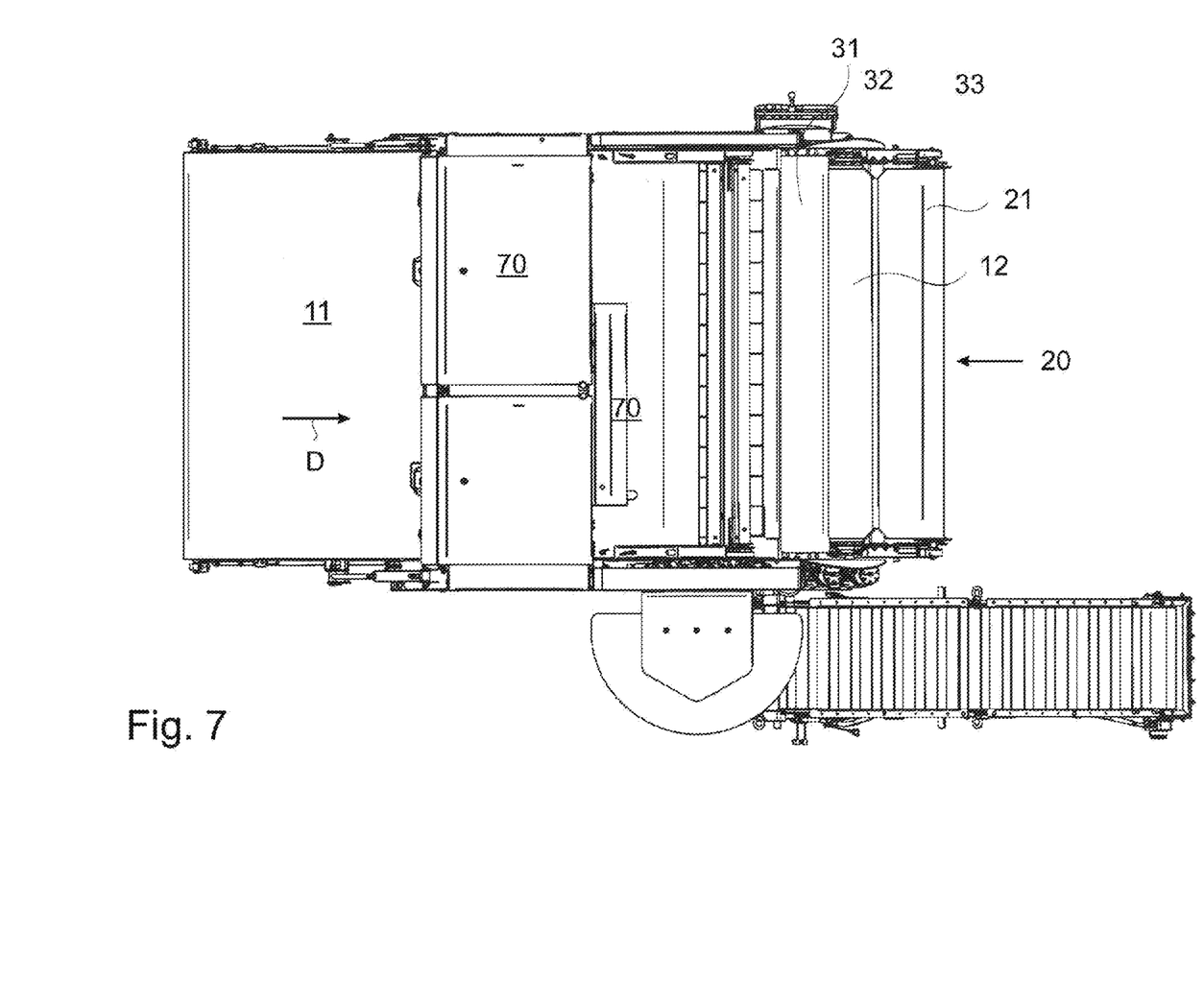
FIG. 7 shows a top view of the device according to FIG. 1 further illustrating a diverting means.
Figure 8:
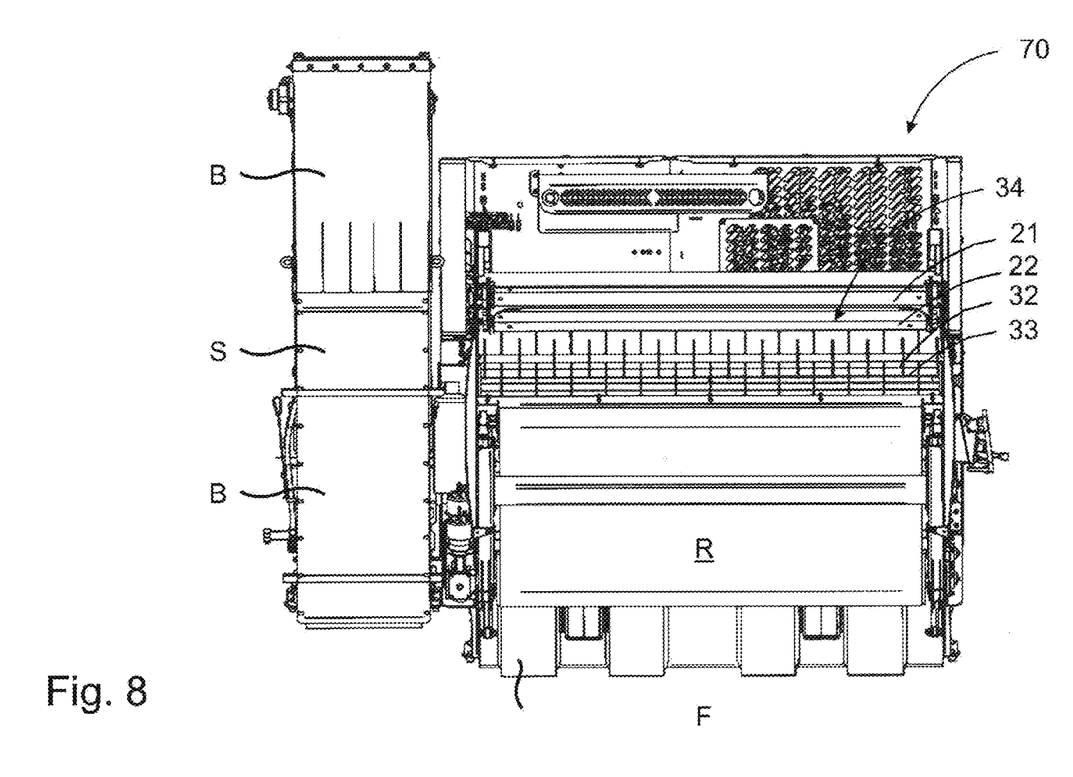
FIG. 8 shows a rear view of the device according to FIG. 1 further illustrating a diverting means.
Figure 9:
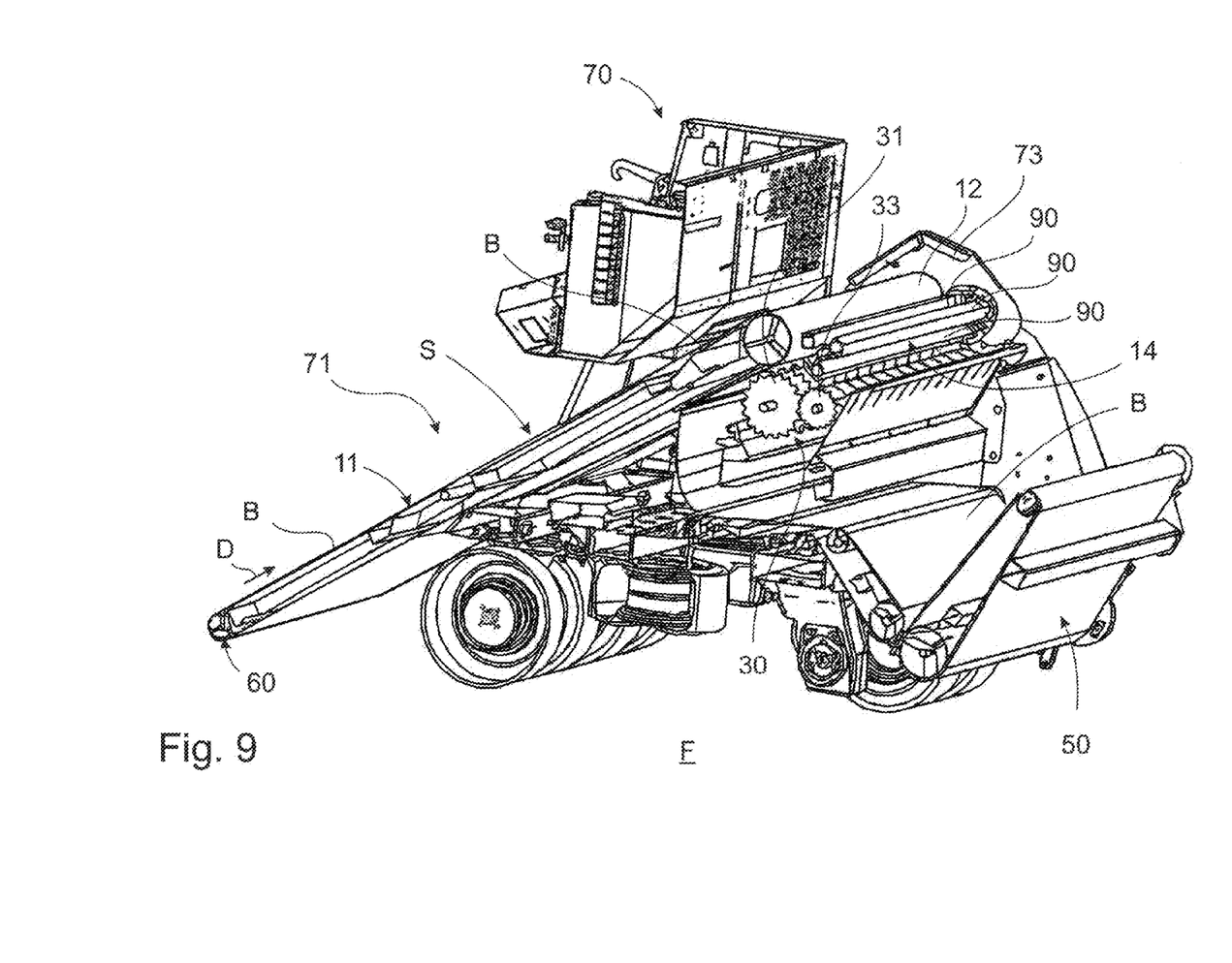
FIG. 9 shows a perspective view of the device according to FIG. 1.

FIG. 2 shows an enlarged detailed view of the device according to FIG. 1 to better illustrate the details of transport means 10, diverting means 20, and emptying means 30. FIG. 7 shows a top view of the device according to FIG. 1 further illustrating a diverting means, FIG. 8 shows a rear view of the device according to FIG. 1 further illustrating a diverting means, and FIG. 9 shows a perspective view of the device according to FIG. 1.

The transport means 10 can comprise conveyor lines and/or belts that convey the artificial turf B up the ramp 11. Ramp 11 can be configured as suitable transport means.

In conveying direction D of the artificial turf B downstream of the diverting roller 12, a diverting means 20 engages with the turf B comprising in this embodiment a combination of two tapping rollers 21, 22 that, on the one hand, fold the artificial turf B, and on the other hand, widen at the same time its surface to enable the filling material to fall off from its pile easily. The tapping of the tapping rollers 21, 22, that are designed with a square-edged cross section, separates the filling material partly from the artificial turf B, or at least loosens it. The filling material can consist, for example, of sand, (rubber) granulate, or soil.

In the diverted region of the artificial turf B, i.e. seen in conveying direction D in the folding region of the artificial turf B and downstream the linear conveying path of the transport means 10, the emptying means 30 is arranged. In this particular case, the emptying means 30 consists of a combination of two pressure rollers 31, 32 and another tapping roller 34 arranged in between these pressure rollers 31, 32, wherein the artificial turf B is guided wave-like through the emptying means 30. The two pressure rollers 31, 32 are positioned with respect to the tapping roller 34 arranged there between to push the artificial turf B with its underside against the rotating tapping roller 34. The artificial turf B is tensioned over a lateral surface of the tapping roller 34 and its pile is widened in the region of the tapping roller 34 to ensure the same being very effective. The filling material tapped off falls downward in a pit 43 and on the conveying means 40 configured as conveyor belt 40 arranged transversely to the traveling direction of the device.

The pressure rollers 31, 32 of the emptying means 30 do not show a continuously closed lateral surface, although, this would also be encompassed. The pressure rollers 31, 32 instead consist of individual star wheels arranged on a respective rotational axis attached to the rotational axis orientated with sloped orientation to tumble during rotation. The projections on the respective circumferences engage with the material of the artificial turf B, and do not only press it against the tapping roller 34, but also guide the artificial turf B underneath the transport means 10. The tumbling motion prevents the filling material from being pressed into the artificial turf B in the running track of the pressure rollers 31, 32, and results in simultaneous milling of the material of the artificial turf B to enhance loosening of the filling material. Another pressure roller 33 of the emptying means 30 is provided in the region of the tapping rollers 21, 22 of the diverting means 20 and can be positioned there between.

For threading the artificial turf B, the transport means 10 can be pivoted along a pivoting axis 13 to freely access the emptying means 30 from above. After passing through the emptying means 30, the artificial turf B is guided to the processing means 50 where it is wound up to form a coil R. Basically it is also possible to configure the processing means 50 for chopping or re-laying the filling material-free artificial turf B, or as an exchangeable unit that can be coupled with the device. In order to improve separation efficiency, the tapping rollers 21, 22, and 34 of the present device could have different tapping frequencies e.g., lower tapping frequency in the diverting means 20 than in the emptying means 30.

It should be noted that the rotational speed of all rotating components are synchronized, with respect to the signals of the sensor 80, and with respect to the traveling speed of the device to avoid jamming of the artificial turf B in the device.

Figure 3:
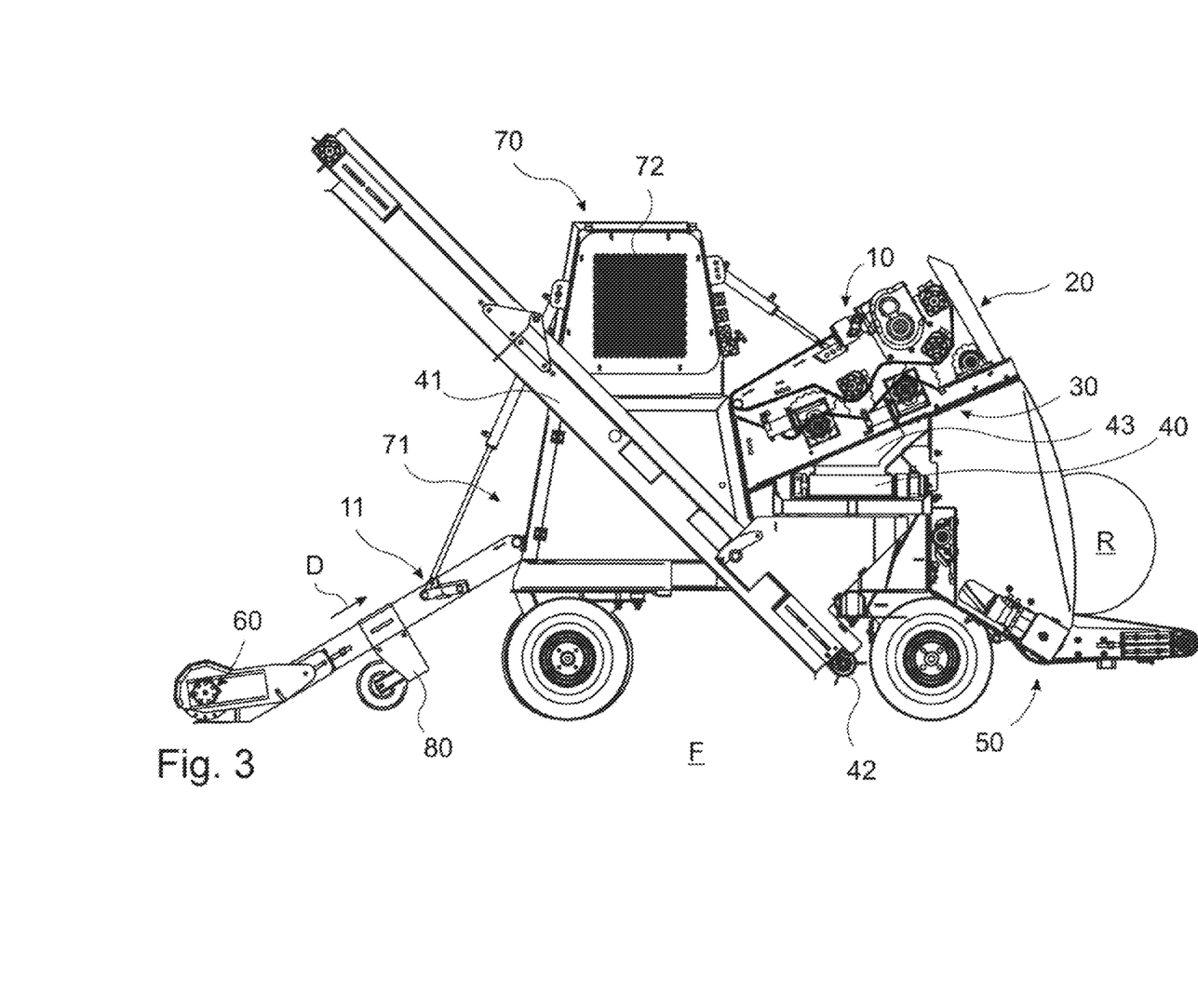
FIG. 3 shows another longitudinal section of a side view of the device according to FIG. 1.

FIG. 3 shows a longitudinal section of the side view of the device according to FIG. 1 where, compared to FIG. 1, only the sectional plane is closer to the viewer. The structures of the ramp 11, the transport means 10, the diverting means 20, the emptying means 30, and the conveying means 40, 41 for removing the filling material tapped off the artificial turf B can be discerned. The conveying means 41 is configured as a conveyor belt that can pivot around a pivoting axis 42 by 180° to pick up the filling material in traveling direction of the device, i.e. on the left hand side of the device of the figure, or in opposite direction of the traveling direction, i.e. in the figure on the right hand side of the device. A portal bridge spans an input area 71 of the device while this bridge is located in conveying direction D of the band material B upstream of the diverting means 20, and the portal bridge 70 carries a drive motor 72 of the device, to position the center of gravity of the device in the middle and to stabilize the device even when high throughput of band material B is processed.

Figure 4:
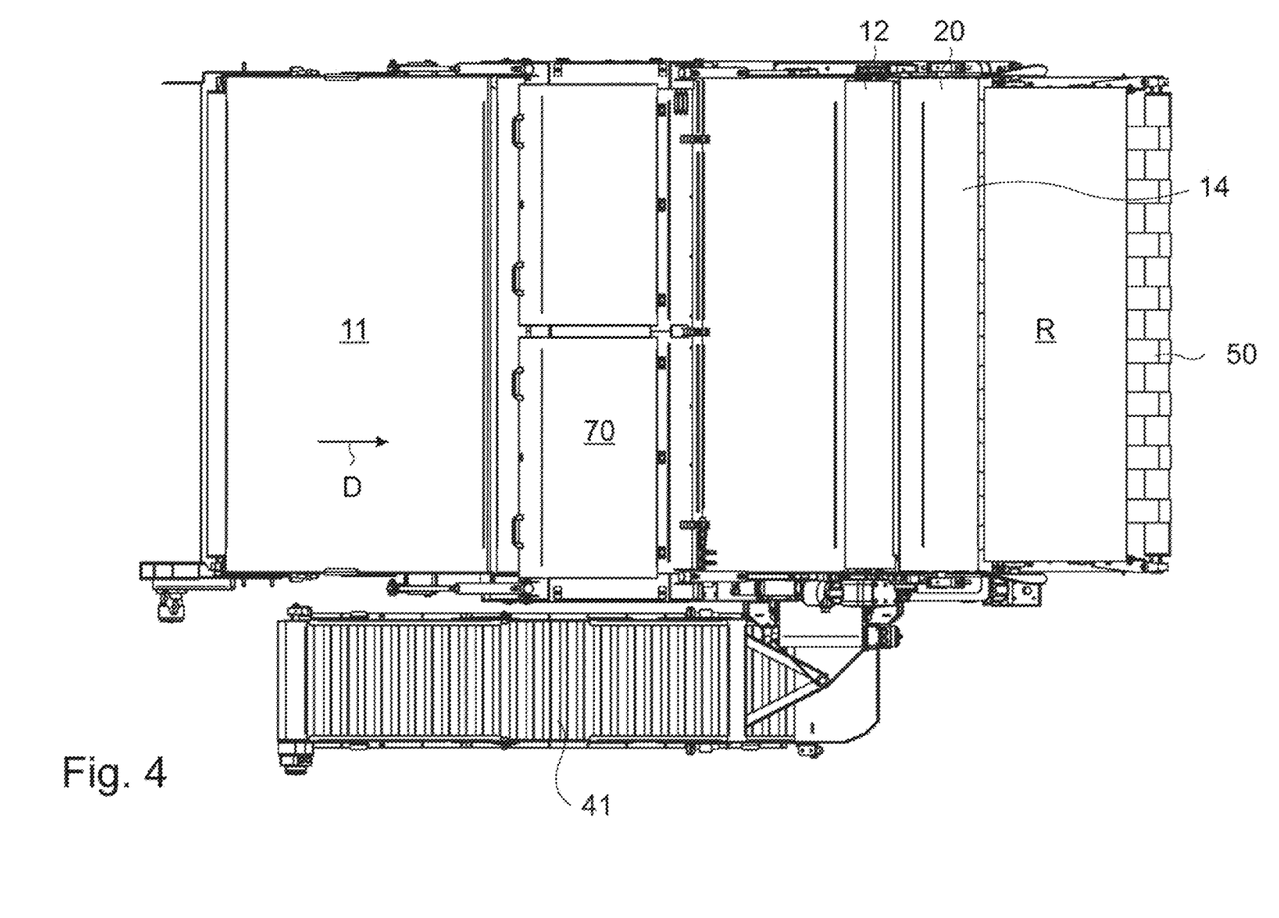
FIG. 4 shows a cross section of a top view of the device according to FIG. 1.

FIG. 4 shows a cross section of a top view of the device according to FIG. 1 where the conveyor belt 41 is shown having a ribbed surface. When pivoted in opposite direction, it can also be filled from the underside (not visible here), and remove the separated filling material not only in traveling direction but also opposite to the traveling direction of the device. This results in a device for separating filling material from a stripe-shaped material that can be used highly flexible while simultaneously working reliably and being handled easily.

Figure 5:
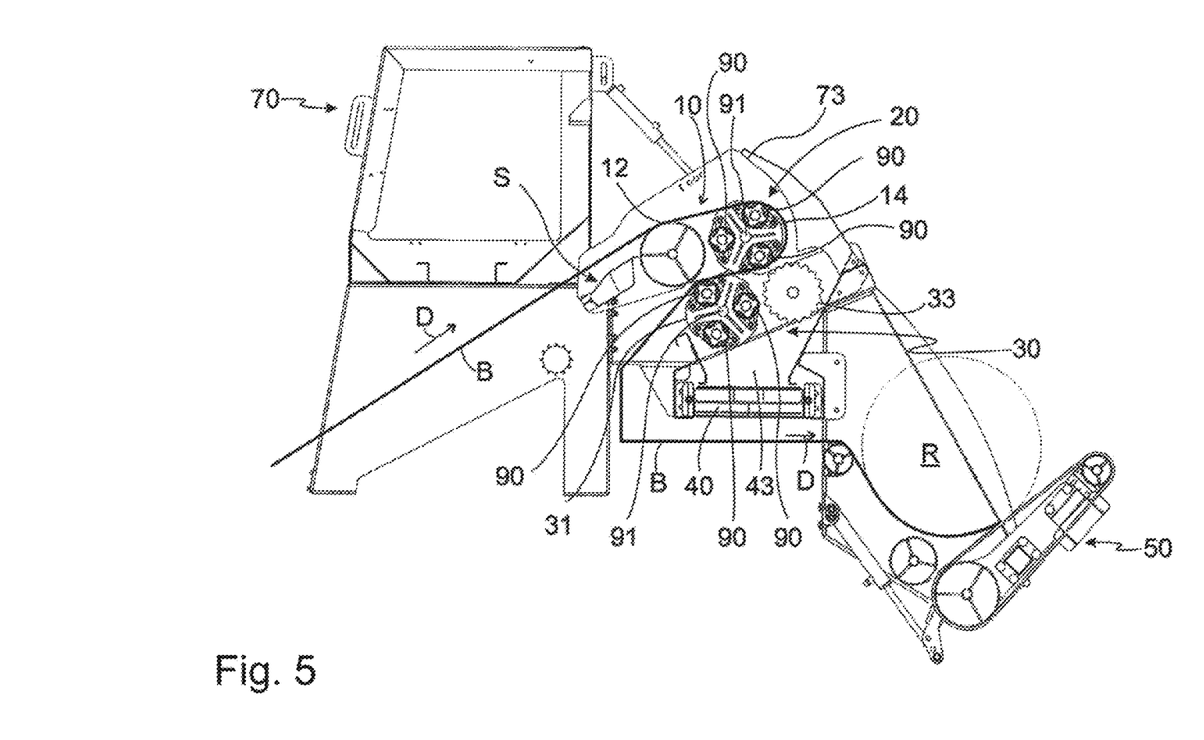
FIG. 5 shows a longitudinal section of a side view of another device according to the invention for separating filling material from a stripe-shaped band material.

FIG. 5 shows a longitudinal section of a lateral view of another device according to the invention for separating filling material from a stripe-shaped band material providing a constructively optimized transport system S wherein a diverting means 20 is configured as transport means 10 of the transport system S. The diverting means comprises a diverting roller 14 conveying and/or transporting the stripe-shaped band material B, as well as diverting and widening the same to enable filling material contained in the band material B to fall off into a pit 43, and to be removed by a conveying means 40 to the side of the device. The diverting means 20 configured as a part of the transport system S in the shape of a diverting roller 14 has a support frame 91 that can be driven rotationally, wherein again several—three in this example—rotationally driven tapping rollers 90 are supported. The tapping rollers 90 have an essentially square cross section that provides for a particularly intensive tapping effect. Thus the band material B is not only conveyed and diverted by the diverting roller 14, but also at the same time discharged in a very efficient way. An emptying means 30 arranged in conveying direction D of the band material B on the level of the diverting means 20 or downstream thereof comprises a pressure roller 31 configured in this example in the same way as the diverting roller 14. This pressure roller 31 thus also has a support frame 91 on which—only by way of example—three tapping rollers 90 are supported. The pressure roller 31 is positioned such that the band material B can be conveyed at least friction-fit, and can be aligned correctly, if required, as well as the same can be widened by the meander-like guidance across a surface of the pressure roller 31, and at the same time can be emptied efficiently by the rotation of the pressure roller 31 and the rotation of the tapping rollers 90. The filling material falling off at the emptying means 30 falls downwards through the pit 43 onto the conveying means 40, and thus can be removed laterally. The described functional focusing upon the diverting roller 14 of the transport system S and the pressure roller 31 of the emptying means 30 allows a less complex construction of the device for removing filling material from a stripe-shaped band material B, requiring less components and thus being weight-reduced and more cost effective, and can be operated with less maintenance and failures. For a directed alignment of the band material B upon the optimized diverting roller 14, the transport system S comprises another diverting roller 12, however, that does not need to have another conveying or emptying function. When inserting the band material B into the invention device, the same is guided via the diverting rollers 12 and 14 of the transport system S, and threaded in a gap between the other pressure roller 33 and the diverting roller 14. Furthermore, a guide plate 73 serves for the purpose of approaching the band material B to this gap between the other pressure roller 33 and the diverting roller 14. This allows for an rather simple loading of the invention device with the stripe-shaped band material B so that a functional focusing to single components and down scaling of the device with an simultaneous increase in efficiency is not a disadvantage for handling.

Figure 6:
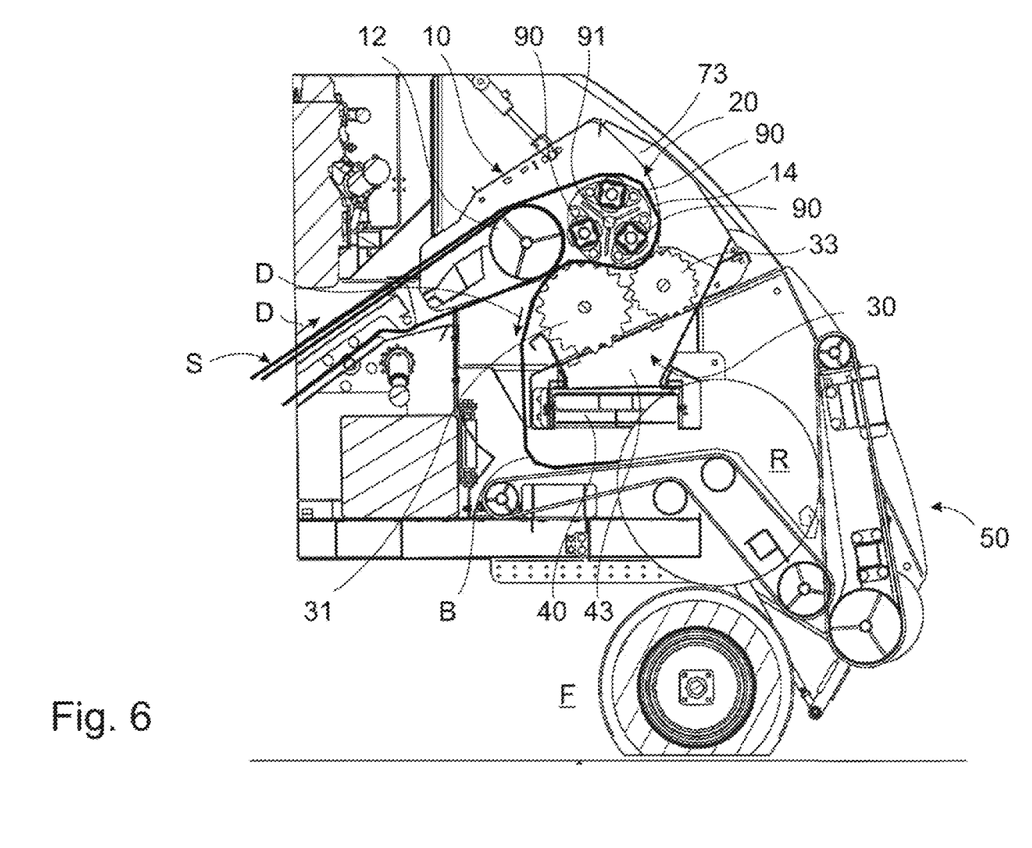
FIG. 6 shows a longitudinal section of a side view of a further device according to the invention for separating filling material from a stripe-shaped band material.

FIG. 6 shows a longitudinal section of a side view of another device according to the invention for separating filling material from a stripe-shaped band material B. the device has a transport system S for conveying the band material B, such as an artificial turf is subsequently discharged from filling material and wound to form a turf coil R. The transport system S comprises, besides a ramp 11 (cf. FIG. 5), a transport means 10, and a diverting means 20 for widening and folding the band material B to enable the filling material to fall off the band material B already in the region of the diverting means 20. A downstream emptying means 30 for the band material B is arranged in a region of the folded band material B. The emptying means 30 has two pressure rollers 31 and 33 each interacting with the diverting means 20 for conveying the band material B, the pressure rollers 31, 33 being arranged seen in three-dimensional view underneath the transport means 10 of the transport system S. Furthermore, this pressure rollers 31 and 33 are arranged and dimensioned such that the band material B can be conveyed meander-like between the diverting means 20 and the two pressure rollers 31 and 33.

The diverting means 20 comprises a diverting roller 12 of the transport means 10 as well as a diverting roller 14 provided with tapping rollers 90 the rotational axes of which extend parallel to rotational axes 91 thereof. The band material B transported in conveying direction D by means of the transport system S, such as artificial turf or a carpet, is, due to inherent stiffness of the turf or carpet material pushed across the gap between the diverting roller 12 and the diverting roller 14 configured as tapping roller. The rotational direction of the rollers 12 and 14 prevents the band material B from being caught in the gap. A guide plate 73 arranged in the area of the diverting roller 14 further aligns the band material B into a gap between the diverting roller 14 and the pressure roller 33 so that it is drawn in and guided into another gap between the diverting roller 14 and the subsequent pressure roller 31.

The specific configuration and dimension of the diverting means 20 and/or its diverting roller 14 and the two pressure rollers 31 and 33 results in a high functional focusing of the conveying and emptying process onto this area. On the one hand, the band material B is conveyed with directional stability and reliability when all mentioned functional parts interact, in particular even if it is loaded heavier and/or more irregular and unevenly with the filling material at any time slide-free and evenly, and, on the other hand, it is emptied with similar reliability. This is performed even in several subsequent steps, so that already during folding by the diverting roller 14 configured as a tapping roller, and eventually during meander-like threading the band material B between the diverting roller 14 and the pressure rollers 31 and 33 with the pile pointing downwards thus equaling a milling of the band material B by an alternating widening and compressing. The meander-like passage between the diverting means 20 and the pressure rollers 31 and 33 the tapping rollers 90 of the diverting roller 14 acting on the band material results in a very efficient discharging of the band material.

The compact arrangement of all functional elements requires only a single common pit 43 through which the separated filling material slides onto a conveyor belt 40, and is thereby removed laterally. The emptied band material B finally approached to a processing means 50 where it is wound up to form a turf coil R. As the entire device is provided with a chassis F the turf coil R can be easily transported to a desired location and be unloaded there. The device presents the most advanced construction of a device for removing filling material from a stripe-shaped band material B. All other presented components correspond to those in the above-described embodiment having a different construction.

Basically, in any of the embodiments of the invention device described herein the arrangement of the functional parts can also be made such that the emptying means 30 also interacts with transport means 10 to enable the band material B to be conveyed in between at least friction fit. In particular, the rotational speed of all moving parts can be synchronized such that the result will be a optimum widening and guiding of the band material B.

The invention refers to:

A device for removing of filling material from a stripe-shaped band material B, in particular from an artificial turf, having a transport system S for conveying the band material B comprising at least one transport means 10, and having a diverting means 20 for widening and folding of the band material B so that the filling material, can fall off the band material B, as well as an emptying means 30 for the band material B arranged in a region of the band material B being folded wherein the device comprises at least one of a pressure roller 31, 32, 33 arranged, when viewed three-dimensionally underneath the transport system S.

A device configured as before wherein the diverting means 20 is configured as part of the transport system S, in particular as transport means 10.

A device configured as before wherein between the at least one pressure roller 31, 32, 33 and the transport system and/or the diverting means 20 a gap is provided for guiding the band material B, in particular for friction-fit transport thereof, wherein the band material B abuts on or is supported on the transport system S and/or an element of the transport system, for example the transport means 10, as well as on the pressure roller 31, 32, 33.

A device configured as before wherein the transport system S covers the emptying means 30 or at least one pressure roller 31, 32, 33 and/or extends in conveying direction D over these.

A device configured as before wherein the at least one pressure roller 31, 32, 33 is able to interact with the at least one transport means 10 of the transport system S and/or the diverting means 20 such that the band material B is conveyable at least friction-fit between transport means 10 and pressure roller 31, 32, 33, and/or diverting means 20 and pressure roller 31, 32, 33.

A device configured as before wherein the band material is allowed for tensioning and emptying means 30 comprises at least one pressure roller 31, 32, 33 for tensioning the band material B.

A device configured as before wherein the emptying means 30 comprises at least one tapping roller 34 for tapping the band material B.

A device configured as before wherein the pressure roller 31, 32, 33 is also part of the emptying means 30.

A device as configured before wherein the pressure roller 31, 32, 33 is arranged in conveying direction of the band material on the level of the diverting roller 20 or downstream of the diverting means 20.

A device configured as before wherein several pressure rollers 31, 32, 33 are provided the rotational speed of which can be controlled with respect to one another and/or jointly.

A device configured as before wherein the emptying means 30 comprises two pressure rollers 31, 32 each interacting with the transport means for guiding the band material, having a tapping roller 34 arranged in between.

A device configured as before wherein the tapping roller 34 is arranged such that the band material B can be guided wave-like or meander-like across the pressure rollers 31, 32.

A device configured as before wherein the at least one pressure roller 31, 32, 33 has a lateral surface with projections for engaging with the band material B.

A device configured as before wherein the at least one pressure roller 31, 32, 33 comprises a rotational shaft having at least one star wheel.

A device configured as before wherein the at least one star wheel is attached with sloped orientation with respect to the rotating shaft.

A device configured as before wherein the diverting means 20 comprises at least one tapping roller 21, 22 over which the band material B can be guided.

A device configured as before wherein the diverting means 20 is formed at least partly by a diverting roller 12.

A device configured as before wherein the tapping rollers 21, 22, 34 have a tapping frequency that is different either individually or in groups.

A device configured as before wherein the at least one transport means 10 of the transport system S is/are configured as one or several circulating transport belts.

A device as configured before wherein the at least one transport means 10 of the transport system S is configured as at least one arrangement of transport belts having a multitude of spaced, parallel arranged transport belts.

A device configured as before wherein an upper and lower run of the transport means 10 serves for transporting the band material B.

A device configured as before wherein a conveying means 40, 41 for removing isolated filling material is provided.

A device described as before wherein the conveying means 40, 41 comprises a conveyor belt 41 that is pivotable by 180°.

A device configured as before wherein a processing means 50 is provided for winding, chopping, or re-laying the filling material-free band material B.

A device configured as before wherein a cutting means 60 is provided for cutting the band material B charged with filling material to size.

A device configured as before wherein the device is configured as a self-propelled device or towed device.

A device configured as before wherein a sensor-based automatic control is provided.

A device configured as before wherein a portal bridge 70 spanning the input area 71 of the device is provided wherein the input area 71 is in conveying direction of the band material B upstream of the diverting means 20, and the portal bridge 70 carries a driving motor 72 of the device.

A device configured as before wherein the diverting means 20 is configured as part of the transport system S, in particular as transport means 10.

A device configured as before wherein the diverting means 20 comprises at least one diverting roller 14 equipped in particular with at least one tapping roller 90.

A device configured as before wherein the emptying means 30 comprises at least one pressure roller 31 equipped in particular with at least one tapping roller 90.

A device configured as before wherein in a region between the diverting means 20 and a first pressure roller 31 another, second pressure roller 33 is arranged for threading the band material B between the diverting means 20 and the first pressure roller 31.

A device configured as before wherein a guide plate 73 is provided for approaching the band material B to a gap between the diverting roller 14 and the other pressure roller 33.

A device configured as before wherein the at least one diverting roller 13 and/or pressure roller 31 comprise/s a rotationally driven support frame 91 for several rotationally driven tapping rollers 90 supported thereon.

A device configured as before wherein the tapping rollers 90 are orientated parallel to the rotational axis of the support frame 91.

A device configured as before wherein the at least one tapping roller 90, seen in the direction of its rotational axis, has a non-circular, in particular cross-like, rectangular, or square cross-section.

A device configured as before wherein the emptying means 30 comprises two pressure rollers 31, 32 each interacting with the diverting means 20 for conveying the band material, the pressure rollers being arranged and dimensioned such that the band material B can be conveyed meander-like between the diverting means 20 and the two pressure rollers 31, 33.

The invention also refers to a device for removing filling material from a stripe-shaped band material B, in particular an artificial turf, with a transport system S for conveying the band material B, the transport system S comprising at least one transport means 10 provided with a diverting means 20 for widening and folding the band material B, so that the filling material can fall off the band material B, as well as an emptying means 30 for the band material B arranged in a region of the folded band material B, and wherein the device comprises at least one pressure roller 31, 32, 33 arranged when viewed three-dimensionally underneath the transport means 10 of the transport system S having the diverting means 20.

The invention also refers to a device for removing filling material from a stripe-shaped band material B, in particular an artificial turf, having a transport system S for conveying the band material B comprising at least one transport means 10, and with a diverting means 20 for widening and folding the band material B, so that the filling material can fall off the band material B, as well as having an emptying means 30 for the band material B arranged in a region of the band material B being folded, and with the device having at least one pressure roller 31, 32, 33 arranged in when viewed three-dimensionally underneath the transport means 10 of the transport system S, wherein the emptying means 30 comprises two pressure rollers 31, 32 each interacting with the diverting means 20 for conveying the band material, the pressure rollers being arranged and dimensioned such that the band material B can be conveyed meander-like between the diverting means 20 and the two pressure rollers 31, 33.

Although the invention has been described by means of exact examples shown in very detail, it is pointed out that this is only for illustration purpose, and that the invention is not necessarily restricted thereto, as alternative embodiments and methods will become clear for those skilled in the art with respect to the disclosure. Accordingly, changes are considered possible without departing from the contents of the invention described herein.

What is claimed is:

1. Device for removing filling material from a stripe-shaped band material, including artificial turf, comprising:
   a transport system for conveying the band material comprising at least one transport means;
   a diverting means for widening and folding of the band material, so that the filling material can fall off the band material; and
   an emptying means for the band material arranged in a region of the band material being folded, wherein the device has at least one of a pressure roller arranged when viewed three-dimensionally underneath the transport system.

2. Device according to claim 1, wherein the diverting means is configured as part of the transport system.

3. Device according to claim 1, further comprising a gap between the pressure roller and the transport system and/or the diverting means for guiding the band material, the gap arranged to provide friction-fit transport of the band material, wherein the band material abuts or is supported on the transport system or an element of the transport system.

4. Device according to claim 1, wherein the device defines a conveying direction, and the transport system covers and/or spans the emptying means or at least one pressure roller in the conveying direction.

5. Device according to claim 1, wherein the at least one pressure roller is arranged to interact with the at least one transport means of the transport system and/or the diverting means so that the band material is conveyed in frictional engagement between the transport means and pressure roller, and/or diverting means and pressure roller.

6. Device according to claim 1, wherein the band material is adapted to undergo predetermined tension, and the emptying means comprises at least one pressure roller for tensioning the band material.

7. Device according to claim 1, wherein the emptying means comprises at least one tapping roller for tapping the band material, and/or tapping rollers have different tapping frequencies either individually or groupwise.

8. Device according to claim 1, wherein the pressure roller is a part of the emptying means.

9. Device according to claim 1, wherein the device defines a conveying direction, and the pressure roller is arranged along the conveying direction on a level of the diverting means or downstream of the diverting means, and further comprising at least one of a first pressure roller and a second pressure roller wherein at least one of the first pressure roller and the second pressure roller defines a rotational speed, and either the rotational speed of (a) the first pressure roller is controlled with respect to the second pressure roller, (b) the rotational speed of the second pressure roller is controlled relative to the first pressure roller, or (c) the rotational speed of the first pressure roller and the second pressure roller is jointly controlled.

10. Device according to claim 1, wherein the emptying means comprises two pressure rollers each interacting with the transport means and a tapping roller arranged therebetween, and wherein the tapping roller is arranged so that the band material is guided wave-like or meander-like over the pressure rollers, and/or wherein the at least one pressure roller defines a lateral surface having projections for engaging with a band material, and/or wherein the at least one pressure roller comprises a rotating shaft with at least one star wheel, and wherein the at least one star wheel is attached with sloped orientation with respect to the rotating shaft.

11. Device according to claim 1, wherein the diverting means comprises at least one tapping roller over which the band material is guided.

12. Device according to claim 1, wherein the diverting means is formed at least partly by a diverting roller.

13. Device according to claim 1, wherein (a) the at least one transport means is configured as one or more circulating transport belts, or (b) the at least one transport means of the transport system is configured as at least one transport belt arrangement comprising a multitude of spaced, parallel arranged transport belts, wherein an upper and lower run of the transport means serves for transporting the band material.

14. Device according to claim 1, further comprising a conveying means for removing separated filling material, wherein the conveying means comprises a conveying belt that is pivoted by 180°.

15. Device according to claim 1, further comprising at least one of (a) a processing means for winding, chopping or re-laying the band material being free from filling material, and (b) a cutting means for cutting the band material filled with filling material to size.

16. Device according to claim 1, wherein the device is constructed and arranged as a self-propelled or towed device, or wherein a sensor-based automatic control is provided, and/or a portal bridge spanning an input area of the device, wherein the input area is located along a conveying direction of the band material in front of the diverting means, and wherein the portal bridge includes a driving motor of the device.

17. Device according to claim 1, wherein the diverting means is configured as a part of the transport system, and/or the diverting means comprises at least one diverting roller equipped in particular with at least one tapping roller, and/or the emptying means comprises at least one pressure roller having at least one tapping roller.

18. Device according to claim 1, further comprising a first pressure roller and a second pressure roller, the second pressure roller being located in an area between the diverting means and the first pressure roller for threading the band material between the diverting means and the first pressure roller, and/or further comprising a guide plate for feeding the band material in a gap between the diverting roller and the further pressure roller, and/or the at least one diverting roller, and/or wherein the pressure roller comprise/s a rotatory drivable support frame for a plurality of tapping rollers that are each driven rotatory and supported in the frame, wherein the tapping rollers are orientated parallel with respect to the rotational axis of the support frame, and/or wherein the at least one tapping roller defines a cross section that is, taken in the direction of the rotational axis, the cross section being one of (a) non-circular, (b) cross-shaped (c) rectangular, or (d) square, and/or wherein the emptying means comprises two pressure rollers each interacting with the diverting means being constructed and arranged so that the band material is conveyed meander-like between the diverting means and the two pressure rollers.

19. Device for removing filling material from a stripe-shaped band material, including artificial turf, having:
   a transport system for conveying the band material comprising at least one transport means having a diverting means for widening and folding of the band material, so that the filling material can fall off the band material;
   an emptying means for the band material arranged in region of the band material being folded; and
   at least one pressure roller that is arranged, when viewed three dimensionally underneath the diverting means.

20. Device for removing filling material from a stripe-shaped band material, including artificial turf:
- a transport system for conveying the band material comprising at least one transport means, and having a diverting means for widening and folding of the band material, so that the filling material can fall off the band material
- an emptying means for the band material arranged in a region of the band material being folded, with the device having at least one pressure roller arranged when viewed three-dimensionally underneath the transport means, wherein the emptying means comprises two pressure rollers each interacting with the diverting means for conveying the band material, the pressure rollers being constructed and arranged so that the band material is conveyed meander-like between the diverting means and the two pressure rollers.

* * * * *